United States Patent
Wang et al.

(10) Patent No.: US 11,000,034 B2
(45) Date of Patent: May 11, 2021

(54) CONTROLLED-RELEASE MATERIAL FOR ANTIFOULING AGENT SENSITIVE AND RESPONSE TO FOULING ORGANISMS AND PREPARATION METHOD THEREOF

(71) Applicant: Luoyang Ship Material Research Institute, Luoyang (CN)

(72) Inventors: Li Wang, Luoyang (CN); Cunguo Lin, Luoyang (CN); Jiyong Zheng, Luoyang (CN)

(73) Assignee: LUOYANG SHIP MATERIAL RESEARCH INSTITUTE, Luoyang (CN)

( * ) Notice: Subject to any disclaimer, the term of this patent is extended or adjusted under 35 U.S.C. 154(b) by 0 days.

(21) Appl. No.: 16/616,943

(22) PCT Filed: Mar. 15, 2018

(86) PCT No.: PCT/CN2018/079064
§ 371 (c)(1),
(2) Date: Nov. 25, 2019

(87) PCT Pub. No.: WO2018/214619
PCT Pub. Date: Nov. 29, 2018

(65) Prior Publication Data
US 2020/0245618 A1    Aug. 6, 2020

(30) Foreign Application Priority Data
May 26, 2017   (CN) .......................... 201710382834.7

(51) Int. Cl.
*A01N 25/10*   (2006.01)
*A01N 25/28*   (2006.01)
*A01N 41/02*   (2006.01)
*A01N 37/10*   (2006.01)

(52) U.S. Cl.
CPC ............ *A01N 37/10* (2013.01); *A01N 25/10* (2013.01); *A01N 25/28* (2013.01); *A01N 41/02* (2013.01)

(58) Field of Classification Search
None
See application file for complete search history.

(56) References Cited

FOREIGN PATENT DOCUMENTS

| CN | 1182761 A | | 5/1998 |
|---|---|---|---|
| CN | 103656729 | * | 3/2014 |
| CN | 105062175 A | | 11/2015 |
| CN | 107083095 A | | 8/2017 |
| JP | H0517499 A | | 1/1993 |
| JP | H06346000 A | | 12/1994 |
| WO | 2011034931 A2 | | 3/2011 |

OTHER PUBLICATIONS

Huang et al., Studies of Surface Coverage and Orientation of DNA Molecules Immobilized onto Preformed Alkanethiol Self-Assembled Monolayers, Langmuir 2000, 16, 3272-3280 (Year: 2000).*
Jourdainne et al., Dynamics of Poly(L-lysine) in Hyaluronic Acid/Poly(L-lysine) Multilayer Films Studied by Fluorescence Recovery after Pattern Photobleaching, Langmuir 2008, 24, 7842-7847 (Year: 2008).*
Khademhosseini et al., Layer-by-layer deposition of hyaluronic acid and poly-l-lysine for patterned cell co-cultures, Biomaterials 25 (2004) 3583-3592 (Year: 2004).*
Szarpak et al., Designing Hyaluronic Acid-Based Layer-by-Layer Capsules as a Carrier for Intracellular Drug Delivery, Biomacromolecules 2010, 11, 713-720 (Year: 2010).*
Dominique Collin, et. al., Mechanical Properties of Cross-Linked Hyaluronic Acid/Poly-(L-lysine) Multilayer Films, Macromolecules, Nov. 26, 2004, pp. 10195-10198, vol. 37, No. 26.

* cited by examiner

*Primary Examiner* — Jennifer A Berrios
(74) *Attorney, Agent, or Firm* — Bayramoglu Law Offices LLC

(57) ABSTRACT

A controlled-release material sensitive and response to fouling organisms for an antifouling agent includes an encapsulating precursor and a crosslinking agent. A hyaluronic acid/polyL-lysine nano-shell controlled-release material is prepared by an alternating layer-by-layer self-assembly of hyaluronic acid and poly-L-lysine, and a polypropylene ammonium chloride/poly-L-glycine nano-shell controlled-release material is prepared by an alternating layer-by-layer sell-assembly of polypropylene ammonium chloride and poly-L-glycine. The crosslinking agent is composed of 1-(3-dimethylaminopropyl)-3-ethylcarbodiimide hydrochloride and N-hydroxythiosuccinimide. Based on the specific catalytic hydrolysis characteristic of fouling organism extracellular proteases on the controlled-release material, the purpose of adjusting the release of antifouling agents adaptively with the change of fouling organisms in off-season/peak-season can be achieved, prolonging the service life of the antifouling coatings.

5 Claims, No Drawings

CONTROLLED-RELEASE MATERIAL FOR ANTIFOULING AGENT SENSITIVE AND RESPONSE TO FOULING ORGANISMS AND PREPARATION METHOD THEREOF

CROSS REFERENCE TO THE RELATED APPLICATIONS

This application is the national phase entry of International Application No. PCT/CN2018/079064, filed on Mar. 15, 2018, which is based upon and claims priority to Chinese Patent Application No. 201710382834.7, filed on May 26, 2017, the entire contents of which are incorporated herein by reference.

TECHNICAL FIELD

The present invention relates to a controlled-release material for an antifouling agent sensitive and response to fouling organisms and a preparation method thereof, and belongs to the field of marine biofouling prevention.

BACKGROUND

Biofouling causes serious harm to ships and underwater facilities. Currently, smearing antifouling coatings is a main action to solve the problem. Antifouling agent-type antifouling coatings now have a largest market share in the coating market. Due to a limited content of antifouling agents in coatings, a controlled release of the antifouling agents is a key means to prolong a service life of such coatings while maintaining an antifouling effect. The existing antifouling coatings are mainly tin-free self-polishing antifouling coatings, which have three main problems. Firstly, an effective controlled release technique is absent for the antifouling agent in the coatings, and the antifouling agent is prone to "burst release" phenomenon, resulting in a large amount of waste, and a generally short service life of the antifouling coatings (generally only 3-5 years). Secondly, copper substances (such as cuprous oxide, pyrrolidone, etc.), which are currently used as major antifouling agents, have a devastating impact on the marine ecological environment. They have been banned in some areas and are facing a trend of restriction and ban. Thirdly, with the further implementation of China's Marine strategy, large ships with long dock repair intervals and a high readiness ratio are constructed in bulk, requiring matched long-term antifouling coating materials. However, the lifetime of existing coatings cannot meet the long-term antifouling needs.

Therefore, using new environment-friendly antifouling agents, such as natural products and quasi-natural products with efficient antifouling activity, and achieving the purpose of efficient utilization and long-term antifouling through antifouling agents controlled release technology, is an important development direction of new long-term and environment-friendly antifouling coating materials.

At present, the slow-release technology for antifouling agents mainly includes porous material adsorption, high specific surface area material absorption, or material embedding technique, thus achieving the purpose of slow release of antifouling agents. US Oceanographic Institution performed an in-depth study on the release behavior and release rate of antifouling agents by using copper-plated microtubules as slow-release carriers of antifouling agents. Price et al. embedded natural marine antifouling active substances in microcapsules, which allowed a slow release of the active substances and significantly improved the service life. Deasy et al. used halloysite microtubules as slow-release carriers of antifouling agents and studied the storage of antifouling molecules by microtubules and slow-release behavior of antifouling molecules. Domestic scholars also used microtubules such as carbon nanotubes and nano titanate tubes to embed new antifouling agents including isothiazolone to control the release rate.

The above slow-release technology has played a positive role in delaying the release rate of antifouling agents and prolonging their service life. However, at present, the slow-release technology still has serious deficiencies. Firstly, at present, antifouling agents adsorbed in porous materials are generally released by diffusion, and the release process thereof is less affected by marine environmental factors such as seawater temperature and pH value, etc. Secondly, the self-polishing resin antifouling agents having antifouling side groups are usually released by hydrolysis, and the release rate has poor correlation with the growth level and season of fouling organisms. These factors lead to poor correlation between the release of antifouling agents and the growth level of fouling organisms. Even though in the grown off-season of fouling organisms or in areas with low growth level of fouling organisms such as deep sea, antifouling agents are continuously released, with poor controllability and serious waste. It is difficult to meet the need of controlled release of antifouling agents in the development of long-term, environmental-friendly antifouling materials.

SUMMARY

The objective of the present invention is to overcome the deficiencies of the prior art, and to provide a controlled-release material for an antifouling agent sensitive and response to fouling organisms and a preparation method thereof. Fouling microorganisms are widely distributed in seawater and on surfaces of fouling macroorganisms, and growth level of the fouling microorganisms is directly affected by seasons, sea areas and environmental nutrient conditions. Extracellular products of most fouling microorganisms are rich in enzymes, especially proteases. Based on a specific catalytic hydrolysis characteristic of extracellular proteases on a proteinoid immobilized material for the antifouling agent, the antifouling agent can be controlled to release by self-degradation reactions of polymer biomaterials under an action of the fouling microorganisms in a marine environment, thus adjusting the release of antifouling agents adaptively with the change of fouling organism in off-season/peak-season, and prolonging a service life of antifouling coatings.

In order to achieve the above objectives, aiming at the urgent need for green and long-term antifouling coatings in harsh marine fouling environment such as marine ships and marine structures, and targeted the problems of waste and short service life of antifouling agents caused by poor adaptability of traditional slow-release technology of antifouling agents to fouling environment, the present invention provides a controlled-release material for an antifouling agent sensitive and response to fouling organisms and a preparation method thereof. Hyaluronic acid/poly-L-lysine, and polypropylene ammonium chloride/poly-L-glycine are used as raw materials, and sodium carbonate is used as a template, so as to prepare a nano-shell material for encapsulating the antifouling agent by a layer-by-layer self-assembly method.

The controlled-release material for an antifouling agent sensitive and response to fouling organisms includes an encapsulating precursor and a crosslinking agent, and the encapsulating precursor includes two types, one is a combination of hyaluronic acid and poly-L-lysine, the other is a combination of polypropylene ammonium chloride and poly-L-glycine. The two combinations are used to prepare two different types of controlled-release materials. A hyaluronic acid/poly-L-lysine nano-shell controlled release material is prepared by an alternating layer-by-layer self-assembly of the hyaluronic acid and the poly-L-lysine, and a polypropylene ammonium chloride/poly-L-glycine nano-shell controlled release material is prepared by the alternating layer-by-layer self-assembly of the polypropylene ammonium chloride and the poly-L-glycine. The crosslinking agent is composed of 1-(3-dimethylaminopropyl)-3-ethylcarbodiimide hydrochloride and N-hydroxythiosuccinimide. Based on a difference in water solubilities of antifouling agents, controlled-release materials can be prepared by two methods. For water-soluble antifouling agents, nano-shells sensitive and response to fouling organisms are prepared by using the sodium carbonate as the template for loading the antifouling agents. For water-insoluble or slightly water-soluble antifouling agents, the antifouling agents are directly encapsulated in the controlled-released material sensitive and response to fouling organisms.

A preparation method of the controlled-released material sensitive and response to fouling organisms, wherein based on a difference in water solubilities of antifouling agents, the controlled-release material can be prepared by two methods. For water-soluble antifouling agents, nano-shells sensitive and response to fouling organisms are prepared by using the sodium carbonate as the template for loading the antifouling agents, and for water-insoluble or slightly water-soluble antifouling agents, the antifouling agents are directly encapsulated in the controlled-release material sensitive and response to fouling organisms. The two methods are respectively as follows.

1. A preparation method of a nano-shell controlled-release material sensitive and response to fouling organisms for encapsulating an antifouling agent using a sodium carbonate as a template is as follows:

(1) Preparation of the nano-shell controlled-release material sensitive and response to fouling organisms for encapsulating the antifouling agent using porous calcium carbonate microspheres with a diameter of 0.5-5 µm as the template for the controlled-release material sensitive and response to fouling organisms for encapsulating the antifouling agent, to prepare a nano-shell carrier for encapsulating the antifouling agent; dispersing the porous calcium carbonate microspheres in a buffer solution consisting of 0.1 mM Tris-HCl and 0.15 M NaCl; using the following two encapsulating precursors, wherein one is a combination of hyaluronic acid and poly-L-lysine, the other is a combination of polypropylene ammonium chloride and poly-L-glycine, and the two combinations are used to prepare two different types of controlled-release materials; adding the hyaluronic acid with a weight percentage of 1-10% and stirring for 1-4 hours, and then adding the poly-L-lysine with a weight percentage of 1-10% and stirring for 1-2 hours; or, adding the polypropylene ammonium chloride with a weight percentage of 1-10% and stirring for 1-4 hours, and then adding the poly-L-glycine with a weight percentage of 1-10% and stirring for 1-2 hours; performing an alternating layer-by-layer self-assembly on the two materials for 2-4 times, centrifuging microspheres obtained after the layer-by-layer self-assembly at 3000-4000 rpm, and taking microspheres after the centrifugation for reserve; preparing a buffer solution consisting of 0.02 M 2-(N-morpholine) ethylsulfonic acid and 0.15 M NaCl, adding 1-(3-dimethylaminopropyl)-3-ethylcarbodiimide hydrochloride to the buffer solution to control a concentration of the 1-(3-dimethylaminopropyl)-3-ethylcarbodiimide hydrochloride between 100 and 200 mM, adding N-hydroxythiosuccinimide to control a concentration of N-hydroxythiosuccinimide at 50 mM, dispersing the microspheres in the buffer solution and stirring for 12-24 hours, centrifuging the microspheres and then dissolving in a gluconolactone solution to remove the calcium carbonate, wherein an adding amount of gluconolactone is 2-3 times the weight of the porous calcium carbonate microspheres, obtaining the nano-shell controlled-release material sensitive and response to fouling organisms for encapsulating the antifouling agent;

(2) Loading Antifouling Agent

Dissolving a water-soluble antifouling agent in the 2-(N-morpholine) ethanesulfonic acid/NaCl buffer solution, and then dispersing the nano-shell controlled-release material for encapsulating the antifouling agent therein to load the antifouling agent into the nano-shell structure, wherein a loading time is 0.5-5 hours; obtaining an antifouling agent encapsulated in the controlled-release material sensitive and response to fouling organisms.

The water-soluble antifouling agent includes sodium benzoate, sodium paeonol sulfonate, etc.

2. A preparation method of an antifouling agent directly encapsulated in a controlled-release material sensitive and response to fouling organisms is as follows:

grinding water-insoluble or slightly water-soluble antifouling agents to particles with a diameter of 0.5-5 um, and dispersing in a buffer solution consisting of 0.1 mM Tris-HCl and 0.15 M NaCl; using the following two encapsulating precursors, wherein one is a combination of hyaluronic acid and poly-L-lysine, the other is a combination of polypropylene ammonium chloride and poly-L-glycine, and the two combinations are used to prepare two different types of controlled-release materials; adding the hyaluronic acid with a weight percentage of 1-10% and stirring for 1-4 hours, and then adding the poly-L-lysine with a weight percentage of 1-10% and stirring for 1-2 hours; or, adding the polypropylene ammonium chloride with a weight percentage of 1-10% and stirring for 1-4 hours, and then adding the poly-L glycine with a weight percentage of 1-10% and stirring for 1-2 hours; performing an alternating layer-by-layer self-assembly on the two materials for 2-4 times, centrifuging microspheres obtained after the layer-by-layer self-assembly at 3000-4000 rpm, and taking microspheres after the centrifugation for reserve;

preparing a buffer solution consisting of 0.02 M 2-(N-morpholine) ethylsulfonic acid and 0.15 M NaCl, adding 1-(3-dimethylaminopropyl)-3-ethylcarbodiimide hydrochloride to the buffer solution to control a concentration of 1-(3-dimethylaminopropyl)-3-ethylcarbodiimide hydrochloride between 100 and 200 mM, adding N-hydroxythiosuccinimide to control a concentration of N-hydroxythiosuccinimide at 50 mM, dispersing the microspheres in the buffer solution and stirring for 12-24 hours, After crosslinking, centrifuging the microspheres to obtain the antifouling agent directly encapsulated in the controlled-release material sensitive and response to fouling organisms.

The water-insoluble or slightly water-soluble antifouling agents include cuprous oxide, cuprous thiocyanate, copper pyrrolidine, etc.

According to the preparation method of the controlled-release material sensitive and response to fouling organisms for antifouling agent, controlled-release materials, for water-soluble antifouling agents and water-insoluble and slightly water-soluble antifouling agents respectively, are formed through the alternating layer-by-layer self-assembly and cross-linking of precursors such as hyaluronic acid/poly-L-lysine and polypropylene ammonium chloride/poly-L glycine. The process is simple, the synthesis process and products are environmental-friendly, and the products belong to the key component of environmental-friendly antifouling materials. Based on the specific catalytic hydrolysis characteristic of fouling organism extracellular proteases on the controlled-release material, the purpose of adjusting the release of antifouling agents adaptively with the change of fouling organisms in off-season/peak-season can be achieved, prolonging the service life of the antifouling coatings.

DETAILED DESCRIPTION OF THE EMBODIMENTS

The present invention will be further described below in conjunction with specific embodiments.

Embodiment 1

Encapsulation of a water-soluble antifouling agent in a controlled-release material sensitive and response to fouling organisms.

Porous calcium carbonate microspheres with a diameter of 0.5 μm were dispersed in a buffer solution consisting of 0.1 mM Tris-HCl and 0.15 M NaCl. Hyaluronic acid with a weight percentage of 1% was added, and stirred for 1 hour. Then poly-L-lysine with a weight percentage of 10% was added, and stirred for 2 hours. An alternating layer-by-layer self-assembly was performed on the two materials for two times. Microspheres after the layer-by-layer self-assembly were centrifuged at 3000 rpm for three times, and the microspheres were taken for use after centrifugation.

A buffer solution consisting of 0.02 M 2-(N-morpholine) ethylsulfonic acid and 0.15 M NaCl was prepared. 1-(3-dimethylaminopropyl)-3-ethylcarbodiimide hydrochloride was added to the buffer solution to control a concentration of 1-(3-dimethylaminopropyl)-3-ethylcarbodiimide hydrochloride at 100 mM. N-hydroxythiosuccinimide was added to control a concentration of N-hydroxythiosuccinimide at 50 mM. The microspheres were dispersed in the buffer solution and stirred for 12 hours. The microspheres were subjected to a centrifugation and then dissolved in a gluconolactone solution to remove the calcium carbonate, and a mass ratio of the gluconolactone to the calcium carbonate is controlled at 2:1, to obtain a nano-shell controlled-release material sensitive and response to fouling organisms for antifouling agents.

The water-soluble antifouling agent such as sodium benzoate was dissolved in the 2-(N-morpholine) ethanesulfonic acid/NaCl buffer solution, and then the nano-shell material for encapsulating antifouling agents was dispersed to load the antifouling agent into the nano-shell structure. The loading time was 0.5 hours. After centrifugation, an antifouling agent was encapsulated in the controlled-release material sensitive and response to fouling organisms.

Embodiment 2

Encapsulation of a water-soluble antifouling agent in a controlled-release material sensitive and response to fouling organisms.

Porous calcium carbonate microspheres with a diameter of 5 μm were dispersed in a buffer solution consisting of 0.1 mM Tris-HCl and 0.15 M NaCl. Polypropylene ammonium chloride with a weight percentage of 10% was added and stirred for 4 hours. Then Poly-L glycine with a weight percentage of 1% was added and stirred for 1 hour. An alternating layer-by-layer self-assembly was performed on the two materials for four times. Microspheres after the layer-by-layer self-assembly were centrifuged at 4000 rpm for three times. After centrifugation, the microspheres were taken for use.

A buffer solution consisting of 0.02 M 2-(N-morpholine) ethylsulfonic acid and 0.15 M NaCl was prepared. 1-(3-dimethylaminopropyl)-3-ethylcarbodiimide hydrochloride was added to the buffer solution to control a concentration of 1-(3-dimethylaminopropyl)-3-ethylcarbodiimide hydrochloride at 200 mM. N-hydroxythiosuccinimide was added to control a concentration of N-hydroxythiosuccinimide at 50 mM. The microspheres were dispersed in the buffer solution and stirred for 24 hours. The microspheres were subjected to a centrifugation, and then dissolved in a gluconolactone solution to remove the calcium carbonate, and a mass ratio of the gluconolactone to the calcium carbonate is controlled at 3:1, to obtain a nano-shell controlled-release material sensitive and response to fouling organisms for antifouling agents.

The water-soluble antifouling agent such as sodium paeonol sulfonate was dissolved in the 2-(N-morpholine) ethanesulfonic acid/NaCl buffer solution, and then the nano-shell material for encapsulating antifouling agents was dispersed therein to load the antifouling agent into the nano-shell structure. The loading time was 5 hours. After centrifugation, an antifouling agent was encapsulated in the controlled-release material sensitive and response to fouling organisms.

Embodiment 3

Encapsulation of a water-insoluble antifouling agent in a controlled-release material sensitive and response to fouling organisms.

Cuprous oxide with a diameter of about 0.5 μm was dispersed in a buffer solution consisting of 0.1 mM Tris-HCl and 0.15 M NaCl. Polypropylene ammonium chloride with a weight percentage of 5% was added and stirred for 2 hours, then poly-L-glycine with a weight percentage of 5% was added and stirred for 1.5 hours. An alternating layer-by-layer self-assembly was performed on the two materials for three times. Microspheres after the layer-by-layer self-assembly were centrifuged at 3500 rpm for three times. After centrifugation, the microspheres were taken for use.

A buffer solution consisting of 0.02 M 2-(N-morpholine) ethylsulfonic acid and 0.15 M NaCl was prepared. 1-(3-dimethylaminopropyl)-3-ethylcarbodiimide hydrochloride was added to the buffer solution to control a concentration of 1-(3-dimethylaminopropyl)-3-ethylcarbodiimide hydrochloride at 150 mM. N-hydroxythiosuccinimide was added to control a concentration of N-hydroxythiosuccinimide at 50 mM. The microspheres were dispersed in the buffer solution and stirred for 18 hours. After crosslinking, the microspheres were subjected to a centrifugation to obtain cuprous oxide directly encapsulated in the controlled-release material sensitive and response to fouling organisms.

Embodiment 4

Cuprous thiocyanate with a diameter of about 5 μm was dispersed in a buffer solution consisting of 0.1 mM Tris-HCl and 0.15 M NaCl. Polypropylene ammonium chloride with a weight percentage of 10% was added and stirred for 4 hours, then poly-L-glycine with a weight percentage of 1% was added and stirred for 2 hours. An alternating layer-by-layer self-assembly was performed on the two materials for four times. Microspheres after the layer-by-layer self-assembly were centrifuged at 4000 rpm for three times. After centrifugation, the microspheres were taken for use.

A buffer solution consisting of 0.02 M 2-(N-morpholine) ethylsulfonic acid and 0.15 M NaCl was prepared. 1-(3-dimethylaminopropyl)-3-ethylcarbodiimide hydrochloride was added to the buffer solution to control a concentration of 1-(3-dimethylaminopropyl)-3-ethylcarbodiimide hydrochloride at 200 mM. N-hydroxythiosuccinimide was added to control a concentration of N-hydroxythiosuccinimide at 50 mM. The microspheres were dispersed in the buffer solution and stirred for 24 hours. After crosslinking, the microspheres were subjected to a centrifugation to obtain cuprous thiocyanate directly encapsulated in the controlled-release material sensitive and response to fouling organisms.

Embodiment 5

Copper pyrrolidine with a diameter of about 2 μm was dispersed in a buffer solution consisting of 0.1 mM Tris-HCl and 0.15 M NaCl. Hyaluronic acid with a weight percentage of 1% was added and stirred for 1 hour, then poly-L-glycine with a weight percentage of 10% was added and stirred for 1 hour. An alternating layer-by-layer self-assembly was performed on the two materials for two times. Microspheres after the layer-by-layer self-assembly were centrifuged at 3500 rpm for three times. After centrifugation, the microspheres were taken for use.

A buffer solution consisting of 0.02 M 2-(N-morpholine) ethylsulfonic acid and 0.15 M NaCl was prepared. 1-(3-dimethylaminopropyl)-3-ethylcarbodiimide hydrochloride was added to the buffer solution to control a concentration of 1-(3-dimethylaminopropyl)-3-ethylcarbodiimide hydrochloride at 100 mM. N-hydroxythiosuccinimide was added to control a concentration of N-hydroxythiosuccinimide at 50 mM. The microspheres were dispersed in the buffer solution and stirred for 12 hours. After crosslinking, the microspheres were subjected to a centrifugation to obtain copper pyrrolidine directly encapsulated in the controlled-release material sensitive and response to fouling organisms.

Embodiment 6

Release performance test of cuprous oxide encapsulated in the controlled-release material sensitive and response to fouling organisms.
0.5 g of particles of the cuprous oxide-encapsulated controlled-release material sensitive and response to fouling organisms were dispersed in 20 ml protease solution. After 12 hours, the dispersed solution was centrifuged. The encapsulating layer was observed to be significantly hydrolyzed, and the cuprous oxide particles were observed to be exposed by SEM scanning electron microscopy.

Embodiment 7

Release performance test of sodium paeonol sulfonate encapsulated in the controlled-release material sensitive and response to fouling organisms.
0.5 g of particles of the sodium paeonol sulfonate-encapsulated controlled-release material sensitive and response to fouling organisms were dispersed in 20 ml protease solution, and benthic diatoms were added to the dispersed solution, concentration of the benthic diatoms was controlled to $1.0 \times 10^5$. After 4 hours, the dispersed solution was centrifuged. The encapsulating layer was observed to be hydrolyzed by SEM scanning electron microscopy; and the concentration of the benthic diatoms was reduced to $0.88 \times 10^5$ by microscopic counting.

What is claimed is:

1. A controlled-release material sensitive and responsive to fouling organisms for an antifouling agent, comprising an encapsulating precursor and a crosslinking agent,
   wherein the encapsulating precursor is a polypropylene ammonium chloride and poly-L-glycine nano-shell controlled-release material,
   wherein the polypropylene ammonium chloride and poly-L-glycine nano-shell controlled-release material is prepared by an alternating layer-by-layer self-assembly of polypropylene ammonium chloride and poly-L-glycine; and
   the crosslinking agent comprises 1-(3-dimethylaminopropyl)-3-ethylcarbodiimide hydrochloride and N-hydroxythiosuccinimide.

2. A method of preparing a water-insoluble or slightly water-soluble antifouling agent encapsulated in the controlled-release material sensitive and responsive to the fouling organisms of claim 1, comprising:
   grinding water-insoluble antifouling agents or slightly water-soluble antifouling agents to particles with a diameter of 0.5-5 um, and dispersing the particles in a first buffer solution consisting of 0.1 mM Tris-HCl and 0.15 M NaCl to obtain a first mixed solution;
   adding the polypropylene ammonium chloride with a weight percentage of 1-10% to the first mixed solution to obtain a second mixed solution for stirring for 1-4 hours, and then adding the poly-L-glycine with the weight percentage of 1-10% to the second mixed solution for stirring for 1-2 hours;
   performing an alternating layer-by-layer self-assembly on the polypropylene ammonium chloride and the poly-L-glycine for 2-4 times;
   centrifuging first microspheres obtained after the alternating layer-by-layer self-assembly at 3000-4000 rpm, and taking second microspheres after the centrifugation for reserve;
   preparing a second buffer solution consisting of 0.02 M 2-(N-morpholine) ethylsulfonic acid and 0.15 M NaCl, adding the 1-(3-dimethylaminopropyl)-3-ethylcarbodiimide hydrochloride to the second buffer solution to control a concentration of the 1-(3-dimethylaminopropyl)-3-ethylcarbodiimide hydrochloride between 100 and 200 mM, adding the N-hydroxythiosuccinimide to the second buffer solution to control a concentration of the N-hydroxythiosuccinimide at 50 mM, dispersing the second microspheres in the second buffer solution to obtain a third mixed solution and stirring the third mixed solution for 12-24 hours, after a crosslinking, centrifuging the second microspheres to obtain the water-insoluble or slightly water-soluble antifouling agent encapsulated in the controlled-release material sensitive and responsive to the fouling organisms.

3. The method of claim 2, wherein the water-insoluble antifouling agents or the slightly water-soluble antifouling agents comprise cuprous oxide, cuprous thiocyanate, or copper pyrrolidine.

4. A method of preparing a water-soluble antifouling agent encapsulated in the controlled-release material sensitive and responsive to fouling organisms of claim 1, comprising:

using porous calcium carbonate microspheres with a diameter of 0.5-5 μm as templates;

dispersing the porous calcium carbonate microspheres in a first buffer solution consisting of 0.1 mM Tris-HCl and 0.15 M NaCl to obtain a first mixed solution;

adding the encapsulating precursor, wherein the polypropylene ammonium chloride and poly-L-glycine nano-shell controlled-release material is prepared by adding the polypropylene ammonium chloride with a weight percentage of 1-10% to the first mixed solution to obtain a second mixed solution for stirring for 1-4 hours, adding the poly-L-glycine with a weight percentage of 1-10% to the second mixed solution for stirring for 1-2 hours, and performing an alternating layer-by-layer self-assembly on the polypropylene ammonium chloride and the poly-L-glycine for 2-4 times;

centrifuging first microspheres obtained after the alternating layer-by-layer self-assembly formed by the encapsulating precursor at 3000-4000 rpm, and taking second microspheres obtained after the centrifugation for reserve;

preparing a second buffer solution consisting of 0.02 M 2-(N-morpholine) ethylsulfonic acid and 0.15 M NaCl, adding the 1-(3-dimethylaminopropyl)-3-ethylcarbodiimide hydrochloride to the second buffer solution to control a concentration of the 1-(3-dimethylaminopropyl)-3-ethylcarbodiimide hydrochloride between 100 and 200 mM, adding N-hydroxythiosuccinimide to the second buffer solution to control a concentration of the N-hydroxythiosuccinimide at 50 mM, dispersing the second microspheres in the second buffer solution to obtain a third mixed solution and stirring the third mixed solution for 12-24 hours, centrifuging the second microspheres, and then dissolving the second microspheres in a gluconolactone solution to remove the porous calcium carbonate microspheres to obtain the controlled-release material sensitive and responsive to the fouling organisms, wherein an adding amount of the gluconolactone solution is 2-3 times a weight of the porous calcium carbonate microspheres;

dissolving the water-soluble antifouling agent in a 2-(N-morpholine) ethanesulfonic acid/NaCl buffer solution to obtain a fourth mixed solution, and then dispersing the controlled-release material sensitive and response to the fouling organisms in the fourth mixed solution to load the water-soluble antifouling agent into the controlled-release material sensitive and responsive to the fouling organisms, wherein a loading time is 0.5-5 hours; and obtaining the water-soluble antifouling agent encapsulated in the controlled-release material sensitive and responsive to the fouling organisms after a centrifugation.

5. The method of claim 4, wherein the water-soluble antifouling agent comprises sodium benzoate, or sodium paeonol sulfonate.

\* \* \* \* \*